Patented July 8, 1941

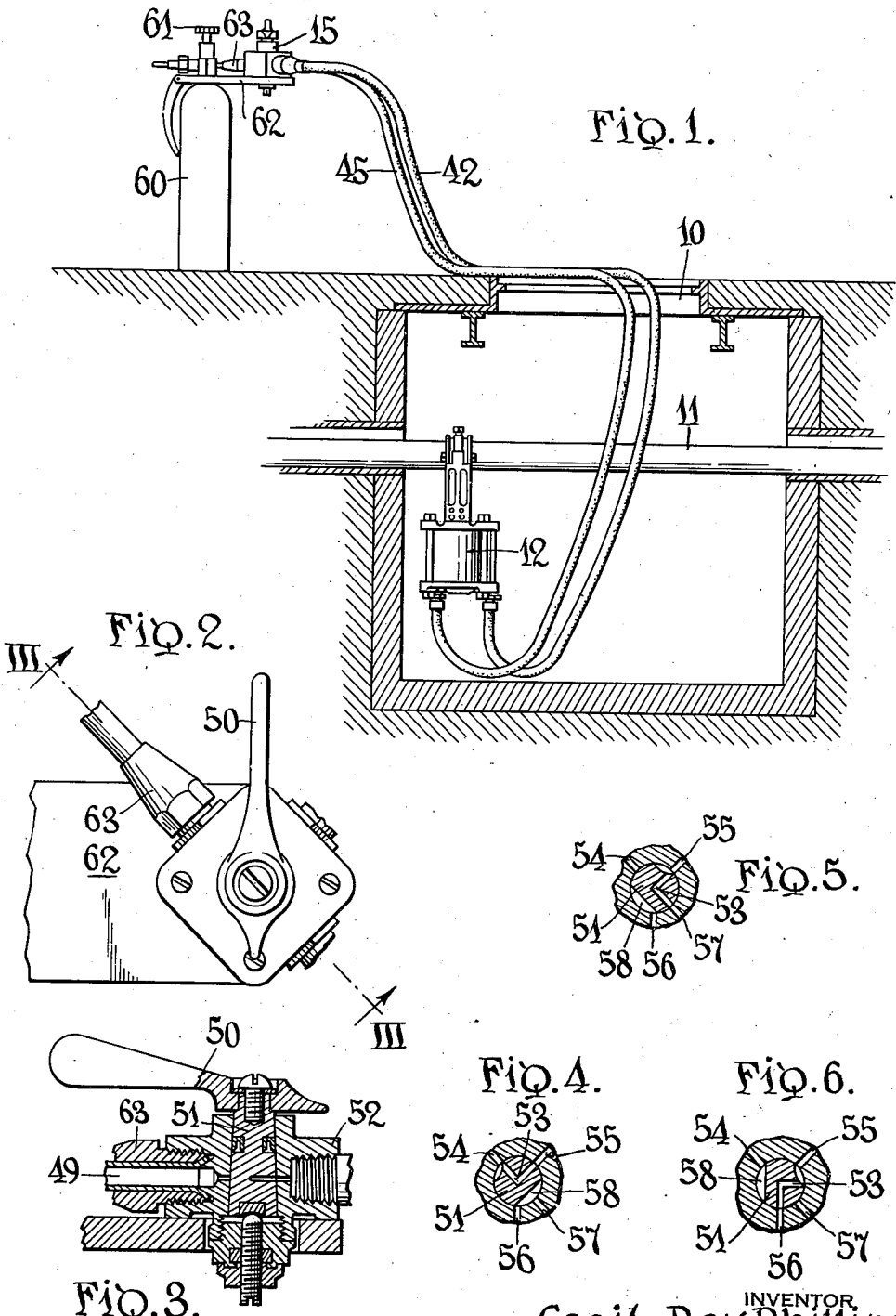

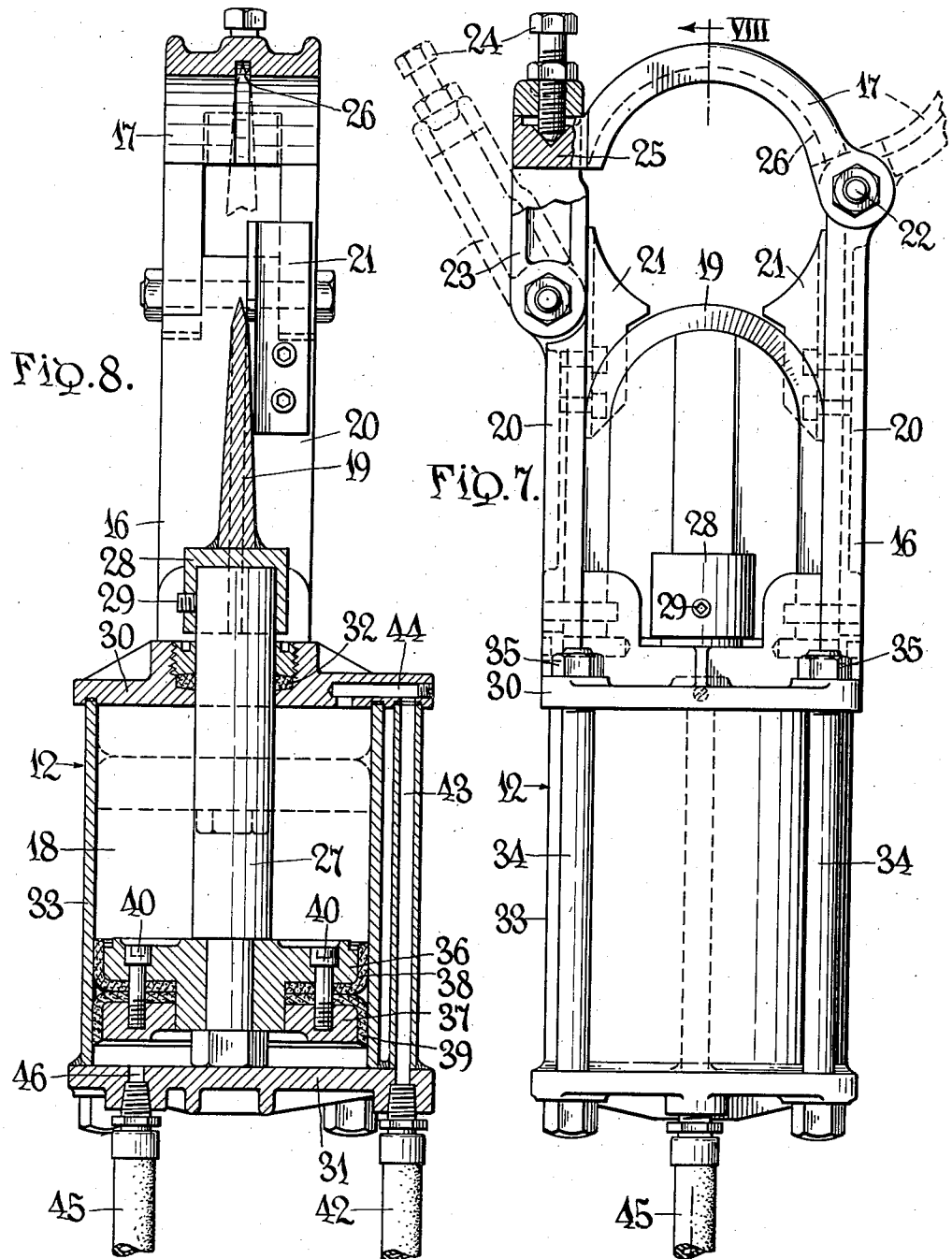

2,248,642

UNITED STATES PATENT OFFICE 2,248,642

DEVICE FOR CUTTING CABLES AND THE LIKE

Cecil Roy Phillips, North Tonawanda, N. Y., assignor of one-third to Howard T. Saperston and one-third to Ralph J. Rosen, both of Buffalo, N. Y.

Application November 26, 1938, Serial No. 242,614

11 Claims. (Cl. 164—47)

This invention relates to cutting devices for severing electric cables and the like.

Heretofore considerable difficulty has been experienced in cutting or severing underground cables, such as are used in cities for the transmission of electric current, or for other purposes. These cables are quite usually three inches or more in diameter and consist of a plurality of copper wires insulated one from the other, together with insulation for the entire body, and the body of the cable is usually covered with lead or other protective coating. These cables are disposed in conduits under streets and thoroughfares. Access is had to them through manholes at predetermined stations, and when any section of a cable becomes damaged or ineffective it is customary to sever the cable so as to remove the damaged section or sections. When it is required to replace the entire cable, the cable is cut, pulled out and in order to readily transport the old cable that is being replaced, it is necessary to cut that cable into sections as it is removed.

Heretofore these cutting or severing operations have been effected by means of a hand saw in the hands of an operator. Such operation is difficult, dangerous and expensive. To cut one of the usual cables by hand saw usually requires in excess of one half hour's time and it is a difficult operation. The crew making the repair is tied up during that period of time and then there is the danger that the central station may not have turned off the current in the particular section being removed, whereby the sawyer is subject to electrical shock or electrocution. There is the further hazard of gas explosions due to the accumulation of gas in the conduit.

The objects of the present invention are to provide a simple and relatively inexpensive device that will efficiently and quickly cut or sever cables of any usual size at a minimum of expense; also to provide a device which may be safely operated by the men of the repair crew without danger to such men of electrocution or injury from gas explosion; also to provide a manually movable and portable device of relatively light weight which will automatically and effectively cut or sever the usual electrical cables in a minimum of time; also to provide a cable cutting device of simple form and construction consisting of relatively few parts that will perform the operation of cable cutting in a small fraction of the time heretofore required for such operation. Further objects will appear in the description and claims hereof.

I have illustrated an embodiment of my invention in the accompanying drawings, wherein—

Fig. 1 is a sectional elevation through a portion of a street or a roadway at a manhole opening, illustrating the device of my invention in position on the cable for the cutting or severing operation;

Fig. 2 is a top plan view of the control valve of my device;

Fig. 3 is a vertical section taken on lines III—III of Fig. 2 through the controlling valve;

Figs. 4, 5 and 6 are fragmentary horizontal sections through the control valve illustrating the connection of the ports for the various stages of operation of my device;

Fig. 7 is a side elevation of the automatic cutter mechanism of my device with a portion thereof broken away; and Fig. 8 is a vertical section taken on lines VIII—VIII of Fig. 7.

I have illustrated my invention as embodied in a relatively small, readily liftable and portable unit having a self-contained power source, the cutting or severing mechanism of which is adapted to be readily placed on the cable desired to be cut beneath the ground, while the power source and control mechanism for the device remains above the ground so that when the device is placed in position the cable may be cut or severed in the matter of a few seconds with no danger to the operator above the ground.

Referring to the drawings, and in particular to Fig. 1 of the drawings, 10 indicates a manhole opening in a street or thoroughfare, 11 the cable extending therethrough and which it is desired to cut or sever, 12 indicates generally the cutting or severing mechanism, 42 and 45 are flexible pressure lines extending from the cutting mechanism to the control valve, 15 indicates the control valve and 60 a tank or capsule filled with the pressure material. In practical operation I have found it desirable to use carbon dioxide as the pressure agent on account of its relative inertness and inexpensiveness and the fact that relatively high pressures can be readily obtained from it.

Referring now to Figs. 7 and 8, it will be noted that the cutting or severing device 12 consists of a head portion 16, a cylinder or body portion 18 and a blade 19. The head portion 16 is provided with a hinged hanger member 17 pivoted as at 22 to the head portion and which is adapted to be locked thereto by means of the yoke or clevis 23 and locking set screw 24, cooperating with the portion of the head indicated at 25. The head portion 16 is also provided with suitable guideways indicated at 20 for the blade member, and with a saddle 21 for preventing the downward movement of the cable upon withdrawal or downward movement of the blade 19. The hanger 17 is provided with a groove 26 which preferably houses an insert of aluminum or other relatively soft material, thereby providing a relatively soft bed for the blade or knife as it reaches the extremity of its cutting movement. The blade or knife 19 which is preferably made of a relatively hard steel alloy is adapted to move up and down in guideways in the head toward and from the hanger member 17. This blade or knife is secured to a piston shaft 27 by suitable means. In the embodiment shown the blade is provided with a relatively wide socket portion 28 which embraces the upper end of the piston shaft and which is secured thereto as by means of set screws 29.

The cylinder 18 is of relatively simple construction consisting of the upper and lower cylinder ends or heads 30 and 31, the upper end 30 being provided with an opening to permit passage therethrough of the piston shaft, the shaft being sealed in that opening by means of packing 32. The cylinder further comprises the cylindrical wall section 33, the ends or heads of the cylinder being held in place thereon through means of bolts 34 and nuts 35. 36 and 37 designate the sections of the piston which are provided with oppositely faced piston packing leathers 38 and 39 and which are secured together by means of screws 40. 41 designates the nut which holds the piston in place on the piston rod.

42 designates a pressure hose which extends from the control valve to the cylinder and 43 and 44 designate passages connecting this hose with the upper end of the cylinder. 45 designates a pressure hose extending from the control valve to the lower end of the cylinder and 46 designates a port from that hose into the lower end of the cylinder. From the description so far it will be seen that if the fluid under pressure is supplied to the lower end of the cylinder and if the upper end of the cylinder is vented to the atmosphere the piston will travel upwardly carrying the blade or cutting device with it; that if the device has been hung onto a cable to be cut the blade or cutter will pierce the cable and sever or cut the same.

The provision of a relatively light weight device of ample power which may be hung from the cable to be severed considerably lessens the expense and cost of cutting cables. No attention need be paid to supplying or creating a base or foundation against which the pressure device must work as the portions exerted against the cable in the operation of the shearer or cutter are balanced or resisted by the portions exerted on the top of the cable by the hanger of the device and are thus absorbed within the device itself.

Referring more particularly to Figs. 1 to 6 of the drawings, the structure and operation of the controlling valve for the device will be described. As hereinbefore stated, it is preferred to use carbon dioxide on account of the fact that relatively great pressure may be obtained quite inexpensively. Tanks or capsules of this gas may be readily purchased as usual commodities and in the operation of this device pressures up to 700 pounds to the square inch may be obtained therefrom. However, it is understood that other gases may be utilized if desired without departing from the spirit of this invention. The usual tank 60 of carbon dioxide is provided with a usual control valve 61. This tank is provided with a bracket 62 which carries the added control valve 15 utilized with this invention. The valve 15 is connected with the tank through means of pipe or nipple 63. The control valve 15 is connected with a handle 50 and a rotatable valve plug 51 operating in a shell 52. This valve plug 51 is provided with an angular passage 53 and a flattened portion 58. The shell is provided with a port 54 which connects with nipple 63 communicating with the supply tank, a port 55 which connects by means of the pressure hose 45 to the lower end of the cylinder, a port 56 which extends to the atmosphere and a port 57 which connects through pressure hose 42 to the upper end of the cylinder of the shearer.

The stages in operation of the device through the control valve are as follows: Starting from a normal or position of rest the gas under pressure is admitted to the lower end of the cylinder through pressure hose 45, and at the same time the upper end of the cylinder through its pressure hose 42 and the passages and ports 43 and 44 is opened to vent to the atmosphere. The limit of travel of the blade is determined by contact of the upper portion of the piston with the top of the cylinder end. In Fig. 8 the uppermost portion of the piston is indicated therein in dotted lines. After the piston has reached its extreme uppermost position and the knife or blade has accordingly cut or severed the cable, the control valve 15 is then turned to a position wherein the upper portion of the cylinder and the lower portion of the cylinder are connected, and the supply of gas under pressure from the supply tank is cut off. This permits an equalization of pressures in the upper and lower portions of the cylinders and in the passageways or conduits leading thereto. Then in the next movement of the valve, the supply of gas under pressure, still being cut off from the supply tank, the lower end of the cylinder is vented to the atmosphere and the gas under pressure remaining in the upper portion of the cylinder in the passages leading thereto and in the pressure hose portion from those passages extending back to the control valve is sufficient, together with gravity, to quickly return the cutter to its starting position.

To more fully understand the operation of the control valve in these respects, if we refer particularly to Figs. 4, 5 and 6 it will be noted that in Fig. 4 the position of the valve is such that the lower end of the cylinder of the cutting device is connected to receive the gas under pressure by reason of the fact that port 55 of the valve is connected by means of the angular passage 53 to port 54 which is in the line extending to the supply tank. At the same time the port 56 in the valve, which extends to the atmosphere, is connected by means of flat portion 58 to port 57, which communicates through pressure hose 42 and the passages and ports to the upper end of the cylinder. This permits the gas under pressure to travel into the lower end of the cylinder and permits air or other media in the upper end of the cylinder to be exhausted to the atmosphere.

The position of the valve in its second stage of operation is illustrated in Fig. 5, wherein it will be noted that port 54, which communicates with the supply of gas under pressure, is closed; that port 55, which communicates with the lower end of the cylinder, is connected to port 57 which communicates with the upper end of the cylinder; and that port 56 of the valve shell is not connected with any of these other operating ports. This cuts off the supply of gas from the supply tank and permits an equalization of pressure between the upper and lower portions of the cylinder.

Fig. 6 illustrates the third stage or position of the control valve. In this stage port 54, which communicates with the supply tank, is still closed; port 55, which communicates with the lower end of the cylinder is now connected to port 56 of the valve shell so as to discharge to atmosphere; and port 57, which communicates with the upper end of the cylinder is closed, so that the gas under pressure in the upper end of the cylinder and in the ports and passages and supply line leading thereto will force the piston downwardly to return the knife or cutter to normal or starting position.

Having thus described my invention, I hereby claim:

1. A readily portable and manually liftable device for severing cables or the like, including in combination, a container for a gas under pressure, a cutting unit comprising a cylinder, a piston, and a piston operated cutting blade, and an engageable and releasable yoke member adapted to secure said cutting unit to and slingingly support said cutting unit from the cable to be severed, and means for directing gas from said container into said cylinder to force said piston operated cutting blade into and through said cable to sever the same.

2. A readily portable and manually liftable device for severing cables and the like, including in combination, a container for a gas under pressure, a control valve associated with said container, a cutting unit comprising a cylinder, a piston, a piston operated cutting blade, and an engageable and releasable yoke member adapted to secure said cutting unit to said cable, and relatively long, flexible conduit connections between said control valve and said cutting unit, whereby said cutting unit may be operated by said control valve from a point substantially remote therefrom.

3. In a device for severing cables or the like, a portable and manually liftable unit including a cylinder and piston, a piston operated cutting blade, parts adapted to be manually yoked so as to completely surround the cable to be severed and take the thrust of the cutting blade, and a power and control means for selectively applying power to said piston and cutting blade to operate the same, said power and control means being at a greater distance from said portable and manually liftable unit than the overall length of said unit.

4. In a device for severing cables or the like, the combination of a cylinder, a vertically movable piston therein, a guide member on said cylinder, a cutting blade connected for movement to said piston and operating in said guide member, a releasable yoke member connected to said guide member, said yoke member being formed and adapted to releasably secure said cylinder, guide member and cutting blade to a cable to be cut and to provide a bed for the cutting blade in its cutting operations.

5. In a device for severing cables or the like, the combination of a cylinder, a piston therein, a cutting blade connected for movement with said piston, an attaching member for releasably attaching said cylinder, piston and cutting blade to a cable to be cut, and means for introducing a gas under pressure into said cylinder to actuate said piston, said means including means for applying gas under pressure to one side of said piston while relieving the pressure on the other side of said piston, means for cutting off the supply of gas under pressure while opening the cylinder at the first side of said piston to the cylinder at the second side of said piston, and means for opening the first side of said cylinder to the atmosphere.

6. In a device for severing cables or the like, the combination of a cylinder, a piston therein, a cutting blade connected for movement with said piston, an attaching member for releasably attaching said cylinder, piston and cutting blade to a cable to be cut, means for introducing a gas under pressure into said cylinder to actuate said piston, said means including means for applying gas under pressure to one side of said piston while relieving the pressure on the other side of said piston, means for cutting off the supply of gas under pressure while opening the cylinder at the first side of said piston to the cylinder at the second side of said piston and shutting off the cylinder at the second side of said piston from the atmosphere whereby the gas pressure at both sides of said piston are equalized without reducing the pressure to atmospheric pressure, and means for opening the first side of said cylinder to the atmosphere while maintaining the cylinder at the second side of said piston shut off from the atmosphere.

7. In a device for severing cables or the like, the combination of a cylinder, a piston therein, a cutting blade connected for movement with said piston, an attaching member for releasably attaching said cylinder, piston and cutting blade to a cable to be cut, conduits for introducing gas under pressure into said cylinder to actuate said piston, and a valve in said conduit relatively remote from said cylinder, said valve when in one position connecting the source of gas pressure to the cylinder on one side of said piston while connecting the cylinder on the other side of the piston to the atmosphere, when in a second position cutting off both sides of said piston from the source of gas pressure and from the atmosphere but connecting said sides to each other, and when in the third position cutting off communication between the opposite sides of said piston while connecting said first named side to the atmosphere.

8. In a device for severing cables or the like, the combination of a concave faced bed abutment adapted to partially surround a cable to be cut, a convex edged cutting blade movable toward and from said concave faced bed abutment and cooperating therewith to sever a cable disposed therebetween, a frame adapted to surround said cable on the sides not surrounded by said concave faced bed abutment and to take the thrust of said convex edged cutting blade, and fluid pressure means for operating said cutting blade.

9. In a device for severing cables or the like, the combination of a concave faced bed abutment adapted to be superimposed upon and partially surround a cable to be cut, a frame adapted to surround said cable on its remaining sides and to hang from said surrounded cable, a convex edged cutting blade mounted in said frame and movable toward and from said concave faced bed abutment and cooperating therewith to sever a cable disposed therebetween by upward movement of said blade, and fluid pressure means for operating said cutting blade.

10. In a device for severing cables or the like, the combination of a concave faced bed abutment adapted to partially surround a cable to be cut, a convex edged cutting blade movable toward and from said concave faced bed abutment from a side of said cable opposite to said abutment, a frame adapted to surround said cable on the sides not surrounded by said concave faced bed abutment and to take the thrust of said convex edged cutting blade, a cylinder, a piston, connections between said cutting blade and said piston whereby said piston operates said cutting blade, and means for supplying fluid under pressure to said cylinder to operate said piston.

11. In a device for severing cables or the like, the combination of a container for a gas under pressure, a cylinder, a piston in said cylinder, a cable cutting blade connected to and actuated by said piston, a control valve, a passage from said container to said control valve whereby gas under pressure may pass from said container into said control valve, conduits connecting said control valve with said cylinder at opposite sides of said piston, fixed ports in said control valve communicating with said conduits, a fixed port in said valve leading to the atmosphere, and shiftable ports in said control valve for first connecting one of said conduit ports with the passage from said container and the other of said conduit ports with the atmospheric port, and then connecting said two conduits together and cutting off the atmosphere and the supply of gas from said conduits and then venting one of said conduits to the atmosphere.

C. ROY PHILLIPS.